United States Patent Office 3,094,973
Patented June 25, 1963

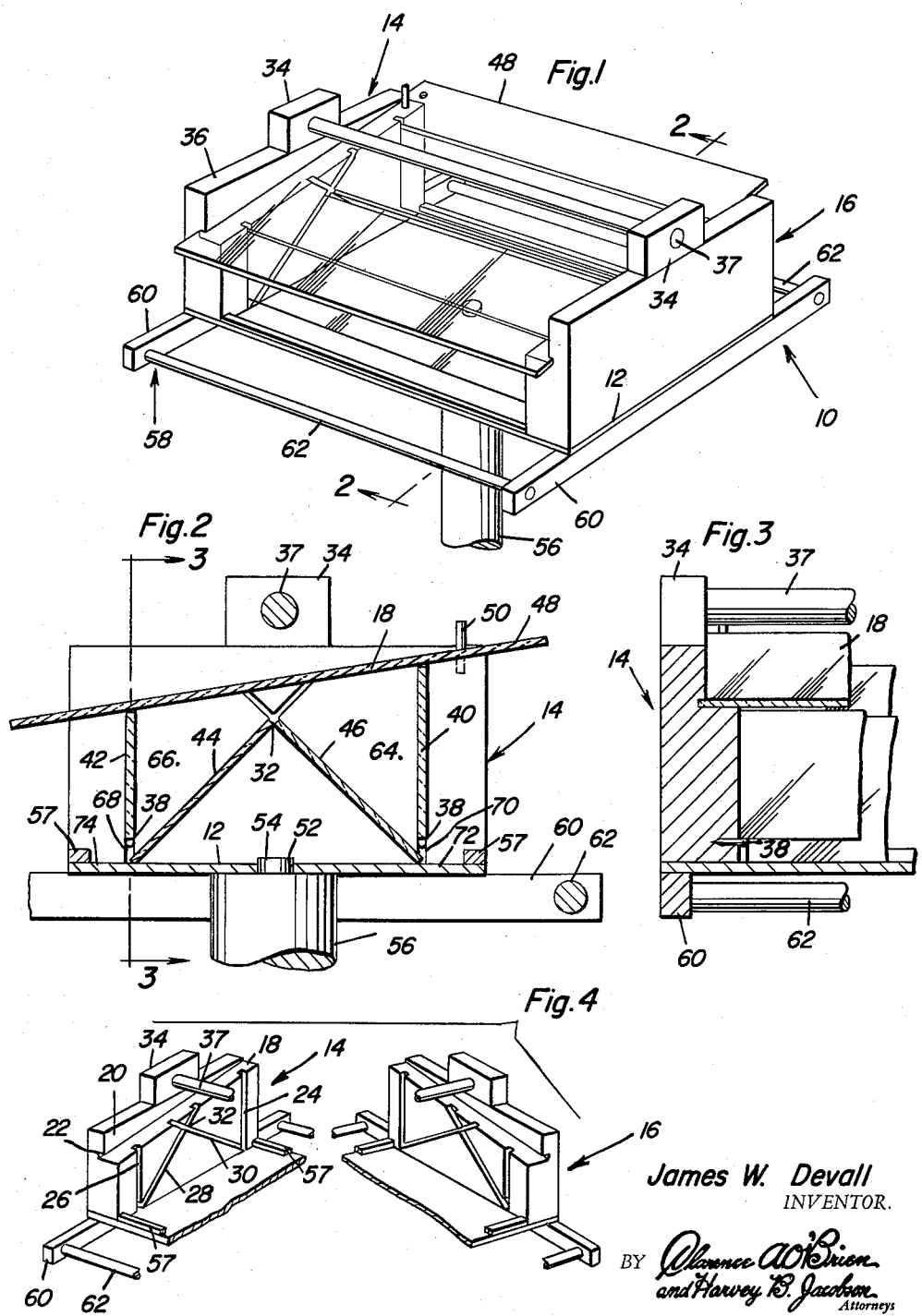

3,094,973
BIRD FEEDER WITH REMOVABLE COMPONENTS
James W. Devall, P.O. Box 726, Fairhope, Ala.
Filed Apr. 21, 1961, Ser. No. 104,626
4 Claims. (Cl. 119—52)

This invention relates to feeding devices, and more particularly to an automatic bird feeder.

It is an object of the invention to provide an automatic bird feeder with the parts thereof so arranged and designed that a minimum of labor and material is required in its construction.

It is another object of the invention to provide an automatic feed dispensing device which comprises a plurality of vertically or diagonally upwardly extending partitions extending transversely of the device which are automatically maintained in place by gravity and friction, and which may be removed and replaced whenever desired merely by lifting upwardly the desired partition from the dispenser body.

It is still another object of the invention to provide a storing and dispensing device which has transparent walls for instant observation of the contents of the device, and which walls or partitions are instantly removable whenever desired for cleaning.

It is another object of the invention to provide a feed dispenser which has end walls which are of identical design, each end wall being a mirror image of the other.

It is still another object of the invention to provide a bird feeding device wherein the top may be easily and instantly removed for refilling the device without disturbing the side walls and partitions thereof.

It is still another object of the invention to provide a bird feeding device which is of sturdy design and construction, and durable and long lasting in use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the invention;

FIGURE 2 is a vertical cross sectional view on an enlarged scale taken substantially through the central portion of the device shown in FIGURE 1;

FIGURE 3 is a vertical cross sectional view taken substantially on the plane of line 3—3 in FIGURE 2; and FIGURE 4 is a view in perspective on a reduced scale of the vertically extending end walls of the device and portions of the parts attached thereto.

As shown in the drawings, the feeding device 10 comprises a horizontally extending base plate or floor 12 which is of rectangular shape in plan. Secured to the upper end surfaces of the base plate 12 so as to extend upwardly therefrom and transversely thereacross, are two end walls 14 and 16 which are of identical design except that each is a mirror image of the other.

Each end wall is preferably cut from a rectangular block of solid material, such as wood. A triangular wedge is first cut from the upper inside corner of each block so as to form a sloping ledge 18 and a vertically extending triangular wall 20. When making the sloping cut which forms the ledge 18, the cutting tool, such as a saw for example, is extended into the end wall 14 or 16 a slight distance beyond the wall 20 so as to form a sloping groove 22 of rectangular cross section whose bottom edge is coplanar with and a continuation of the ledge 18. Four other grooves of rectangular cross section are then formed on the inner face of each end wall.

Two parallel grooves 24 and 26 are formed in a vertical direction and spaced slightly inwardly from the vertically extending ends of the end walls. Two diagonal grooves of similar rectangular cross section are formed on the inner surface of each end wall so as to extend upwardly from the lower ends of the vertical grooves 26 and 24 and cross at a central portion of the end wall a slight distance below the ledge 18 as shown at 32.

Small rectangular blocks 34 are secured by conventional means to the upper horizontally extending surfaces 36 of the end walls. Each block 34 has a central horizontally extending bore aligned with a similar bore in the other block. These bores receive a horizontally extending perch or handle rod 37 which extends between the blocks 34 and is secured within the bores.

Each vertically extending groove 24 and 26 has a support pin 38 located adjacent its lower end and driven into the end wall. Each pin supports a front wall 40 or a rear wall 42 which are vertically slidable in the grooves and extend upwardly to the ledge 18. Two sloping central partitions 44 and 46 are inserted one at a time into the upper ends of the pair of grooves 28 and the pair of grooves 30 respectively. The partitions 44 and 46 extend from the floor 12 up to the cross point 32. As can be seen in FIGURE 2, each partition 44 or 46 may be lifted out of its supporting grooves without interfering with one another. Each of the partitions 42, 44, 46, 40 are fitted within their respective grooves with sufficient clearance to permit the partitions to be easily removed manually. After these four partitions are in place, a roof plate 48 is inserted into and between the parallel grooves 22 so as to rest upon the ledge 18. Although the roof plate 48 is freely slidable within the groove 22, there is preferably enough friction therebetween to retain the roof plate in position. Alternatively, a vertical pin 50 may be inserted through mating holes in the roof plate and one of the ledges 18 so as to positively retain the roof plate in position.

The floor 12 is formed with a central bore 52 adapted to receive a tenon 54 of a supporting post 56 for retaining the feeder in an elevated position.

Rails 57 are secured to the upper surface of the floor 12 at its forward and rear edges by conventional means, and the rails extend between the end walls 14 and 16. A perch assembly 58 is secured to the bottom of the floor 12 and comprises two parallel beams 60 secured to the lower surface of the floor at each end thereof. The beams 60 project beyond the edges of the floor and have aligned apertures therein which receive and retain parallel perching bars 62.

The four walls or partitions 40, 42, 44 and 46 are preferably formed of a transparent sheet material, such as plate glass or plastic. The remainder of the device is preferably composed of an easily formed material, such as wood.

As shown in FIGURE 2, the partitions 46 and 40 form therebetwen a V-shaped storage chamber 64. A similar chamber 66 is formed between the partitions 42 and 44. To fill these chambers with feed, it is only necessary to slide the roof structure 48 laterally, fill the chambers from the top, and then slide the roof structure back into place, and secure it in position, if desired, by the pin 50.

In operation, the feed is fed by gravity from the chambers 64 and 66 through the crevices 68 and 70 formed between the partitions. From the crevices 68 and 70, the feed is forced by gravity onto the exposed areas 72 and 74 at the front and rear edges of the floor 12. The feed is prevented from falling over the edges of the flooring by means of the retaining rails 57.

When taking feed from the feeding device, it is apparent that birds will perch on the rails 62 which provide a convenient location for removing feed from the exposed areas 72 and 74. The crevices 70 and 68 may be adjusted in a vertical direction by re-locating the support pins 38. Preferably, one crevice is of greater vertical dimension than the other so as to permit different types of feed to be stored in the two chambers 64 and 66. For example, grain may be stored in the chamber 64 for seed eating birds such as cardinals, while raisins may be stored in the chamber 44 for fruit eating species such as mocking birds.

From an inspection of the drawings, it is readily apparent that due to the transparent nature of the vertical walls and partitions, the quality of feed in the chambers 64 and 66 may be determined at a glance and from a distance. Also, the vertical and diagonal partitions and walls 40, 46, 44 and 42 may be readily removed whenever desired for cleaning or replacement simply by removing the roof structure 48 and lifting up the walls and partitions. Also, it is to be noted that the roof plate 48 positively retains these four transverse partitions and walls in place without any need for other securing means, see FIGURE 2.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a bird feeder, a base, spaced vertically extending end walls secured thereto, each end wall having an upper portion and a lower portion, said lower portion being offset inwardly relative to the upper portion, a flat ledge formed by the top of the inwardly offset portion, said portions having inner faces, a plurality of grooves, said grooves being in the inner face of said lower portion, said grooves extending downwardly from said ledge, said grooves being of a depth less than the depth of said ledge, partitions slidably received in said grooves, a roof supported on and between the ledges of each end wall, said roof extending over said partitions, an aperture provided through said roof in the portion of the roof which overlaps one of the ledges, said one of the ledges being provided with an upwardly opening blind bore therein, a pin extending through said aperture and into said bore for releasably retaining said roof in position on the feeder, a groove in the inner face of each upper portion, said groove being parallel to and forming an extension of said ledge, the adjacent edge of the roof being slidably received therein, a first one of said grooves extending substantially vertical, and a second one of said grooves extending diagonally upwardly from approximately the lower end of said first one of said grooves, a third one of said grooves spaced from and substantially parallel to said first one of said grooves, and a fourth one of said grooves extending diagonally upwardly from approximately the lower end of said third one of said grooves, said second and fourth ones of said grooves intersecting each other at a point slightly below said ledge, the partitions in said first and third ones of said grooves extending from the ledge downwardly to a point above the lower end of the corresponding diagonal groove, the partitions in said second and fourth grooves extending from the point of intersection of said grooves downwardly to the bottom thereof.

2. The bird feeder of claim 1 wherein said ledge slopes from one end to the other.

3. In a bird feeder, a base, spaced vertically extending end walls secured thereto, each end wall having an upper portion and a lower portion, said lower portion being offset inwardly relative to the upper portion, a flat ledge formed by the top of the inwardly offset portion, said portions having inner faces, a plurality of grooves, said grooves being in the inner face of said lower portion, said grooves extending downwardly from said ledge, said grooves being of a depth less than the depth of said ledge, partitions slidably received in said grooves, a roof supported on and between the ledges of each end wall, said roof extending over said partitions, a first one of said grooves extending substantially vertical, and a second one of said grooves extending diagonally upwardly from approximately the lower end of said first one of said grooves, a third one of said grooves spaced from and substantially parallel to said first one of said grooves, and a fourth one of said grooves extending diagonally upwardly from approximately the lower end of said third one of said grooves, said second and fourth ones of said grooves intersecting each other at a point slightly below said ledge, the partitions in said first and third ones of said grooves extending from the ledge downwardly to a point above the lower end of the corresponding diagonal groove, the partitions in said second and fourth grooves extending from the point of intersection of said grooves downwardly to the bottom thereof.

4. The bird feeder of claim 3 including means for adjustably fixing the position of the roof.

References Cited in the file of this patent

UNITED STATES PATENTS

| | | |
|---|---|---|
| D. 119,588 | Hyde | Mar. 26, 1940 |
| 653,514 | Kasschau | July 10, 1900 |
| 1,333,787 | Winters | Mar. 16, 1920 |
| 1,368,861 | Tracy | Feb. 15, 1921 |
| 1,447,079 | Harmsen et al. | Feb. 27, 1923 |
| 2,524,502 | Wilkinson | Oct. 3, 1950 |